United States Patent
Zhang et al.

(10) Patent No.: US 10,048,713 B2
(45) Date of Patent: Aug. 14, 2018

(54) ENERGY OPERATIONS ACROSS DOMAINS

(71) Applicant: Rockwell Automation Technologies, Inc., Mayfield Heights, OH (US)

(72) Inventors: Guolin Zhang, Shanghai (CN); David D. Brandt, New Berlin, WI (US); Ondrej Flek, Lodenice (CZ); Philip J. Kaufman, Milwaukee, WI (US); Christopher W. Como, Chagrin Falls, OH (US); Charles M. Rischar, Chardon, OH (US)

(73) Assignee: Rockwell Automation Technologies Inc., Mayfield Heights, OH (US)

( * ) Notice: Subject to any disclaimer, the term of this patent is extended or adjusted under 35 U.S.C. 154(b) by 217 days.

(21) Appl. No.: 14/946,574

(22) Filed: Nov. 19, 2015

(65) Prior Publication Data

US 2017/0147022 A1 May 25, 2017

(51) Int. Cl.
| | |
|---|---|
| *G06F 15/16* | (2006.01) |
| *G05F 1/66* | (2006.01) |
| *G05B 15/02* | (2006.01) |
| *H04L 29/08* | (2006.01) |
| *H04L 12/26* | (2006.01) |

(52) U.S. Cl.
CPC ............ *G05F 1/66* (2013.01); *G05B 15/02* (2013.01); *H04L 43/10* (2013.01); *H04L 67/28* (2013.01)

(58) Field of Classification Search
CPC ........... H04L 29/08072; H04L 29/06; H04L 29/08135; H04L 29/08144; H04L 29/0809; H04L 29/08576; H04L 29/06095
USPC ....................................................... 709/201
See application file for complete search history.

(56) References Cited

U.S. PATENT DOCUMENTS

| | | | | |
|---|---|---|---|---|
| 7,984,096 B2* | 7/2011 | Beoughter | ............ | G06F 9/4488 709/203 |
| 2002/0116453 A1* | 8/2002 | Todorov | .............. | H04L 41/0226 709/203 |
| 2003/0151309 A1* | 8/2003 | Hutton | ...................... | H02J 3/14 307/31 |
| 2005/0038885 A1* | 2/2005 | Agrusa | .............. | G05B 19/4185 709/223 |

(Continued)

FOREIGN PATENT DOCUMENTS

EP 2565740 A1 3/2013

OTHER PUBLICATIONS

Craig Resnick: OPC-US, Linking the Legacy, ARC Insights, Internet citation, May 18, 2006, pp. 1-4.

(Continued)

*Primary Examiner* — Mahran Abu Roumi
(74) *Attorney, Agent, or Firm* — Kunzler, PC

(57) ABSTRACT

For energy operations across domains, a method generates a native node and a foreign node. The method further generates protocol reference data that identifies protocol specific relationships between the native node and the foreign node under an address space. In addition, the method links the native node and the foreign node in a native namespace and a foreign namespace by a translation function that automatically converts information between the foreign data structure and the proxy data structure using protocol specific structure converting functions. The method maps a native method calling of the native node to a foreign method calling of the foreign node using a protocol specific method mapping function.

19 Claims, 21 Drawing Sheets

(56) References Cited

U.S. PATENT DOCUMENTS

| | | | |
|---|---|---|---|
| 2007/0067458 A1* | 3/2007 | Chand | G06F 17/30569 709/226 |
| 2007/0067725 A1* | 3/2007 | Cahill | G05B 23/027 715/733 |
| 2007/0074280 A1* | 3/2007 | Callaghan | H04L 63/029 726/12 |
| 2010/0281097 A1* | 11/2010 | Mahnke | H04L 12/403 709/201 |
| 2012/0010758 A1* | 1/2012 | Francino | G05B 17/02 700/291 |
| 2012/0265909 A1 | 10/2012 | Mignot | |
| 2013/0178991 A1* | 7/2013 | Gheerardyn | G05B 13/02 700/286 |
| 2014/0201381 A1 | 7/2014 | Shimizu et al. | |

OTHER PUBLICATIONS

"OPC Unified Architecture'Part 6: Mappings", IEC, IEC 62541-6; 2015; pp. 1-172.
"OPC Unified Architecture—Part 5: Information Model", IEC, IEC 62541-5, Edition 2.0; 2015; pp. 1-244.
"OPC Unified Architecture—Part 4: Services", IEC, IED 62541-4 Edition 2.0; 2015; pp. 1-384.
"OPC Unified Architecture—Part 3: Address Space Model", IED, IEC 62541-3; 2015; pp. 1-258.

\* cited by examiner

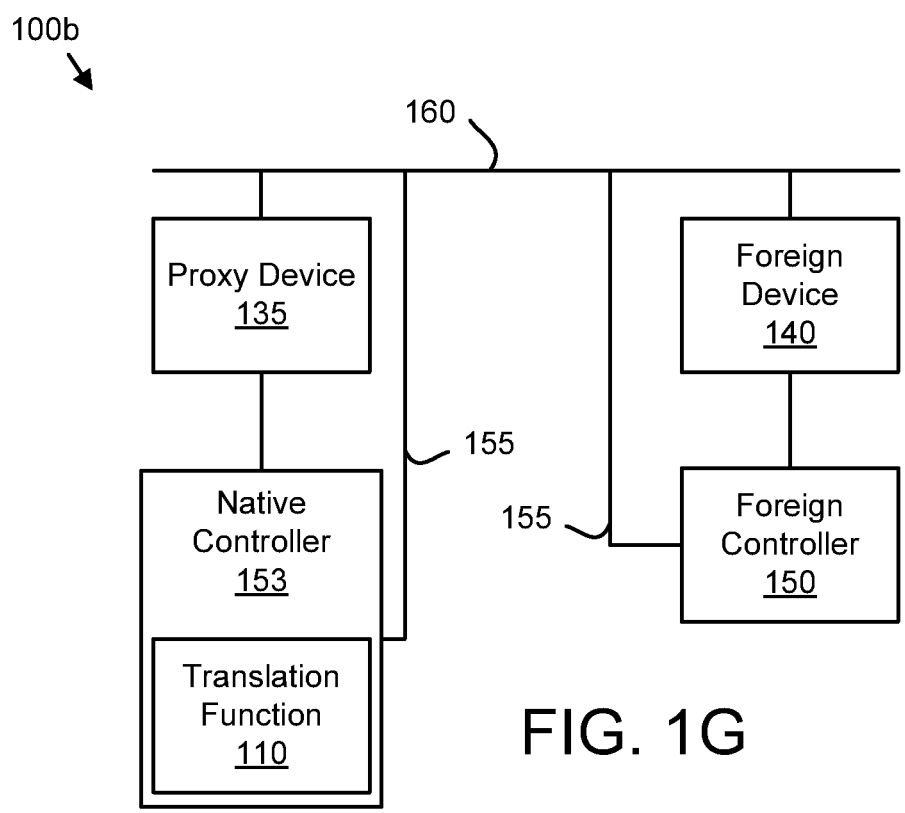

200

| Proxy Data Structure 125 |
| Translation Function 110 |
| Protocol Specific Structure Converting Functions 218 |
| Protocol Specific Method Mapping Functions 219 |
| Native Method Calling 225 |
| Foreign Method Calling 227 |
| Method Mapping Functions 230 |
| Protocol Reference Data 233 |
| Permission Request 235 |
| User-Defined Operations 275 |
| Operation Parameters 280 |
| Operation State Machine 285 |
| State Mapping Table 290 |
| Foreign Device Information 295 |
| Power Level Policy 293 |
| Power Management Command 283 |

| First Actor 325 |
| Transaction Type 330 |
| Second Actor 335 |
| Action Type 340 |
| Action Parameter 345 |
| Parameter Value 350 |

ENERGY OPERATIONS ACROSS DOMAINS

FIELD

The subject matter disclosed herein relates to energy operations and more particularly relates to energy operations across domains.

BACKGROUND INFORMATION

Energy operations such as power management functions reside in domains with different protocols.

BRIEF DESCRIPTION

A method for energy operations across domains is disclosed. The method generates a native node comprising a proxy data structure that is defined with a native protocol and that represents information of a proxy device in a native namespace, and a foreign node comprising a foreign data structure that is defined with a foreign protocol and that represents information of a foreign device in a foreign namespace. The method further generates protocol reference data that identifies protocol specific relationships between the native node and the foreign node under an address space. In addition, the method links the native node and the foreign node in the native namespace and the foreign namespace by a translation function that automatically converts information between the foreign data structure and the proxy data structure using protocol specific structure converting functions. The method maps a native method calling of the native node to a foreign method calling of the foreign node using a protocol specific method mapping function. An apparatus and computer-readable storage medium also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1G is a schematic block diagram illustrating one alternate embodiment of an energy management system;

FIG. 2A is a schematic block diagram illustrating one embodiment of translation data;

DETAILED DESCRIPTION

Figure 1A:
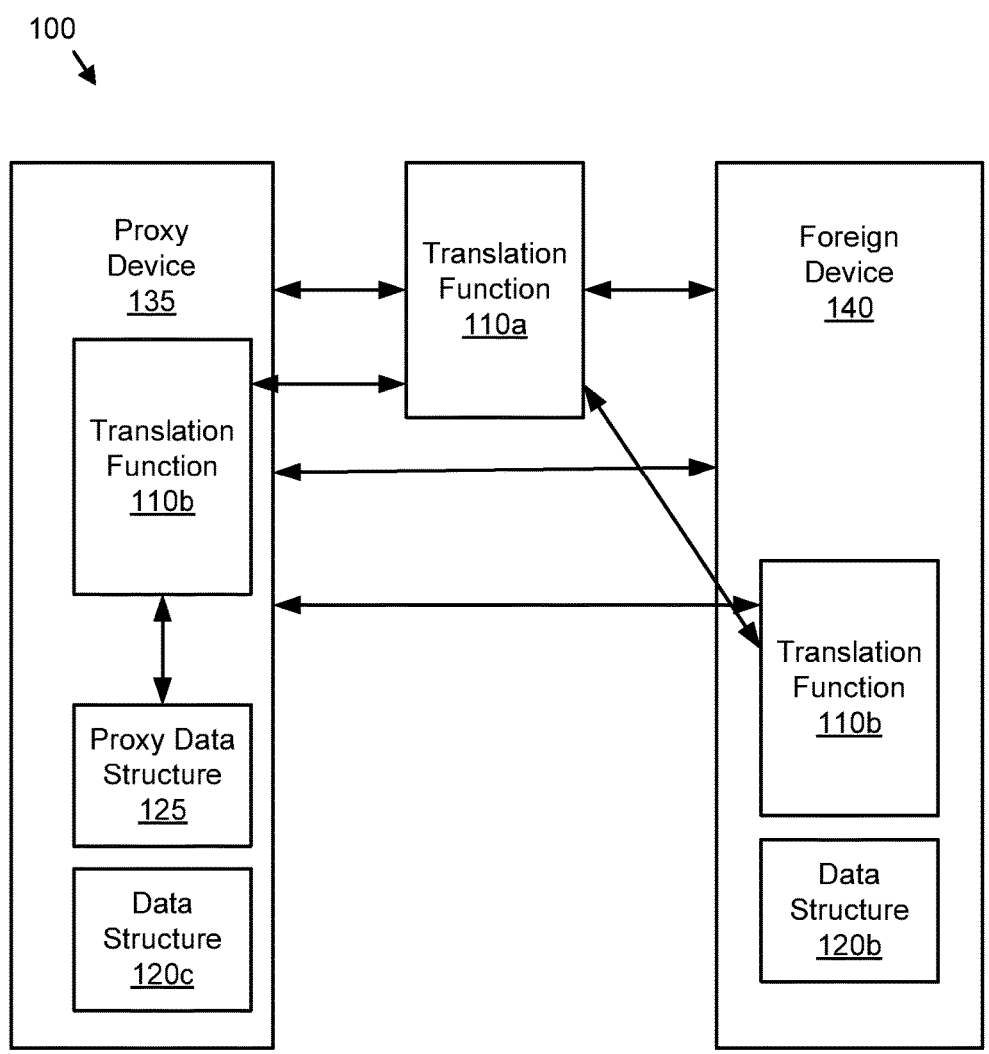
FIG. 1A is a schematic block diagram illustrating one embodiment of a data processing system with a proxy device and a foreign device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1A is a schematic block diagram illustrating one embodiment of a data processing system 100 with a proxy device 135 and a foreign device 140. In one embodiment, the proxy device 135 and the foreign device 140 each communicate with other devices using a different protocol. In one embodiment, the proxy device 135 communicates with other devices using the Common Industrial Protocol (CIP) as defined by ODVA, Inc. as of the filing date of the present application. Alternatively, the native protocol of the proxy device 135 may be an Ethernet protocol and/or a Transmission Control Protocol/Internet Protocol (TCP/IP) protocol.

In addition, the foreign device 140 may communicate with other devices using a non-CIP protocol such as the BACnet protocol as defined by International Standard Organization (ISO) specification ISO 16484-5, the PROFINET PROFIenergy protocol defined by PROFIbus International, an EnergyWise protocol defined by Cisco Systems of San Jose, Calif., the ZigBee SEP2 defined by the Consortium for Smart Energy Profile, and IEC 61850 communication protocol defined by the International Electrotechnical Commission. The communication protocols for the proxy device 135 and the foreign device 140 may specify communication sessions, communication connections, communication services, hardware protocols, binding, and the like.

Because the proxy device 135 and the foreign device 140 communicate using different protocols, a translation function 110 may translate data and communications between the proxy device 135 and the foreign device 140. In one embodiment, the translation function 110a is implemented separately from the proxy device 135 and the foreign device 140. Alternatively, the translation function 110b may be embodied in the proxy device 135. In addition, the translation function 110c may be embodied in the foreign device 140.

The translation function 110 may comprise a network of domain specific OPC UA nodes in an OPC UA server address space as defined by OPC UA specifications from the OPC Foundation as of the filing date of this application. The translation function 110 may comprise method callings organized as OPC UC object node methods with specific domain services. The address space may comprise a node network where nodes of Object, Variable, Method and Reference types are interconnected.

The proxy device 135 may include a native data model embodied in a data structure. Similarly, the foreign device 140 may include a foreign data model embodied in a data structure. The proxy device 135 and the foreign device 140 may include data structures 120 and the proxy device 135 may include a proxy data structure 125. The third data structure 120c and the proxy data structure 125 may be organized in a native domain. The second data structure 120b may be organized in a foreign domain.

Proxy devices 135 and foreign devices 140 may be embodied within a data processing architecture that does not explicitly support the translation function 110. For example, the proxy device 135 and the foreign device 140 may be embodied in an OPC UA system as defined by the OPC UA specification as of the filing of the present application. The translation function 110 may comply with the OPC UA specification while supporting communication between the proxy device 135 and the foreign device 140. The embodiments described herein provide the translation function 110 that allows the proxy device 135 and the foreign device 140 to communicate within an OPC UA compliant data processing system 100 as will be described hereafter.

Alternatively, the proxy device 135 and the foreign device 140 may be embodied in a power management system. The power management system may include mandatory communication protocols for communicating with the foreign device 140. The embodiments described herein provide the translation function 110 that supports the communication protocols for the foreign device 140 so that the proxy device 135 and the foreign device 140 may communicate within the data processing system 100 as will be described hereafter.

The embodiments may enable the management of energy features between one or more domains such as between foreign devices 140 and proxy devices 135, between foreign namespace is 115*b* and native namespace is 115*a*, and/or between foreign nodes and native nodes.

Figure 1B:
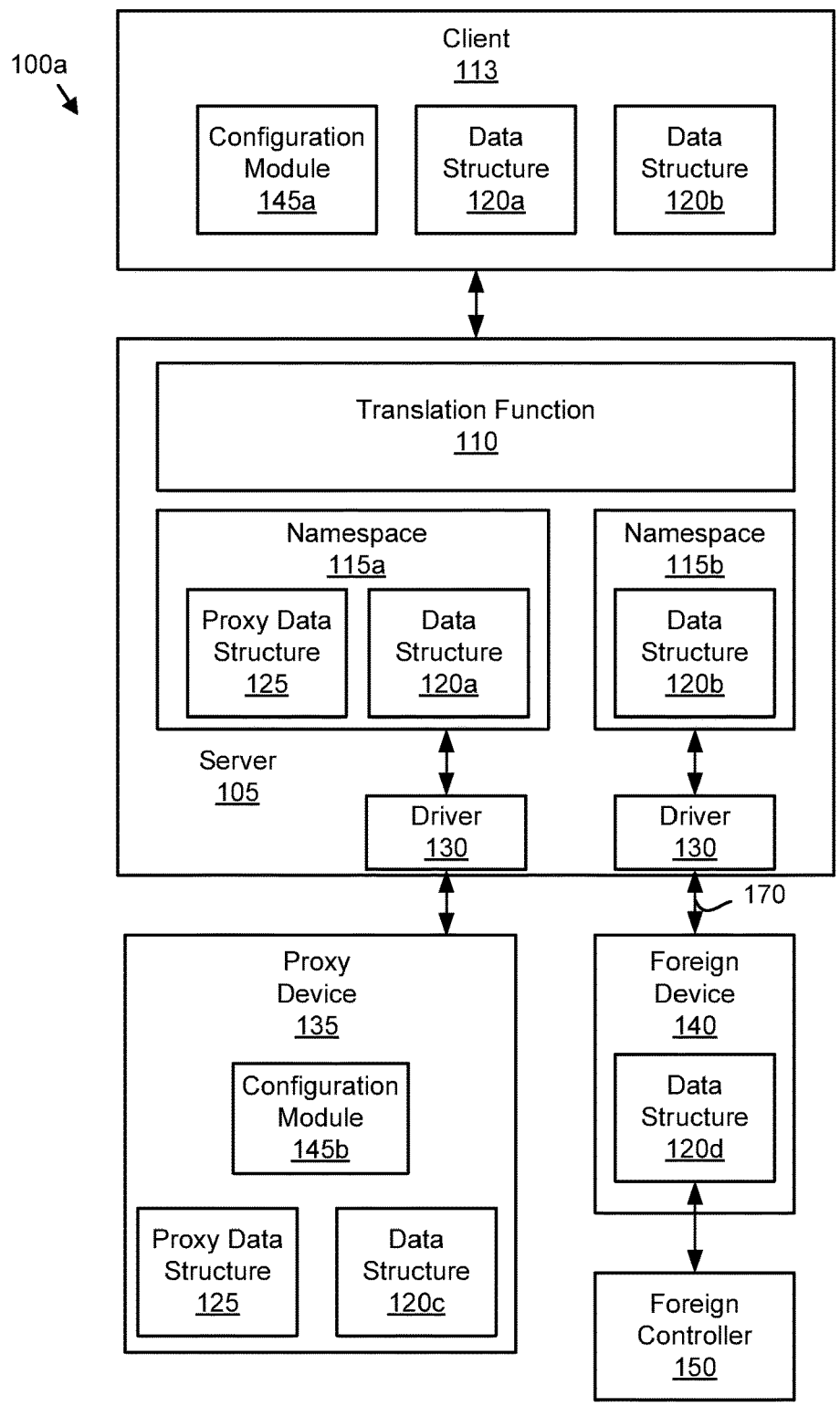
FIG. 1B is a schematic block diagram illustrating one embodiment of a OPC Unified Architecture (UA) system with a client and a proxy device and a foreign device.

FIG. 1B is a schematic block diagram illustrating one embodiment of an OPC UA system 100*a*. The system 100*a* may be the system 100 of FIG. 1A. In the depicted embodiment, the system 110*a* includes a server 105, a client 113, the proxy device 135, the foreign device 140, and a foreign controller 150. The client 113 may be an OPC UA compliant client. The client 113 may be in communication with the server 105. The proxy device 135 and the foreign device 140 may each communicate with the server 105.

In the depicted embodiment, the server 105 includes a native namespace 115*a* and a foreign namespace 115*b* within an address space of the server 105. The foreign namespace 115*b* may include a second data structure 120*b* that stores data for the foreign device 140. In one embodiment, the foreign namespace second data structure 120*b* is synchronized with a corresponding fourth data structure 120*d* that resides on the foreign device 140. The native namespace 115*a* includes a first data structure 120*a* of stores data for the proxy device 135. In one embodiment, the native namespace first data structure 120*a* is synchronized with a corresponding third data structure 120*c* that resides on the proxy device 135. In one embodiment, the data structures 120*a,b* and a proxy data structure 125 are organized as UA node structures with domain specific data structures.

The foreign namespace second data structure 120*b* and the native namespace first data structure 120*a* may include different variables and/or formats. The proxy data structure 125 may be generated for the native namespace 115*a*. In one embodiment, the proxy data structure 125 resides in the OPC UA server 105. The proxy data structure 125 may be used by the translation function 110 to translate data between the second data structure 120*b* of the foreign namespace 115*b* and the first data structure 120*a* of the native namespace 115*a* as will be described hereafter.

The foreign device 140 may communicate with the server 105 through a driver 130. In one embodiment, the foreign device 140 employees a domain specific protocol 170. In addition, the foreign device 140 may be in communication with the foreign controller 150. In one embodiment, the foreign controller 150 manages the foreign device 140. In a certain embodiment, permission must be obtained from the foreign controller 150 before the server 105 may modify the foreign device 140.

The proxy device 135 may communicate with the server 105 through a driver 130. The proxy device 135 may include a configuration module 145*b*. The configuration module 145*b* may coordinate the translation function 110 as will be described hereafter. In one embodiment, the proxy device 135 stores the proxy data structure 125. In addition, the proxy device 135 includes the third data structure 120*c*.

The translation function 110 may also reside within the address space of the server 105. The translation function 110 may be integrated in the OPC UA server 105. Alternatively, the translation function 110 may be a plug-in module for the OPC UA server 105. The translation function 110 translates data and method calls between the foreign namespace 115*b* and the native namespace 115*a* as will be described hereafter. In one embodiment, the translation function 110 converts information between one or more native nodes of the OPC UA system 100*a* and one or more foreign nodes of the system 100*a*.

The client 113 is in communication with the server 105. In one embodiment, the client 113 includes a configuration module 145*a* and one or more data structures 120. The client data structures 120 may be extracted vertically from the server 105 using one or more UA method callings without a translation by the translation function 110. The configuration module 145*a* may coordinate the translation function 110 as will be described hereafter.

The OPC UA address space may be embodied in the OPC UA server 105. In one embodiment, the client 113 is an OPC UA client. In addition, the client 113 may only read the address space by calling specific OPC UA services.

Figure 1C:
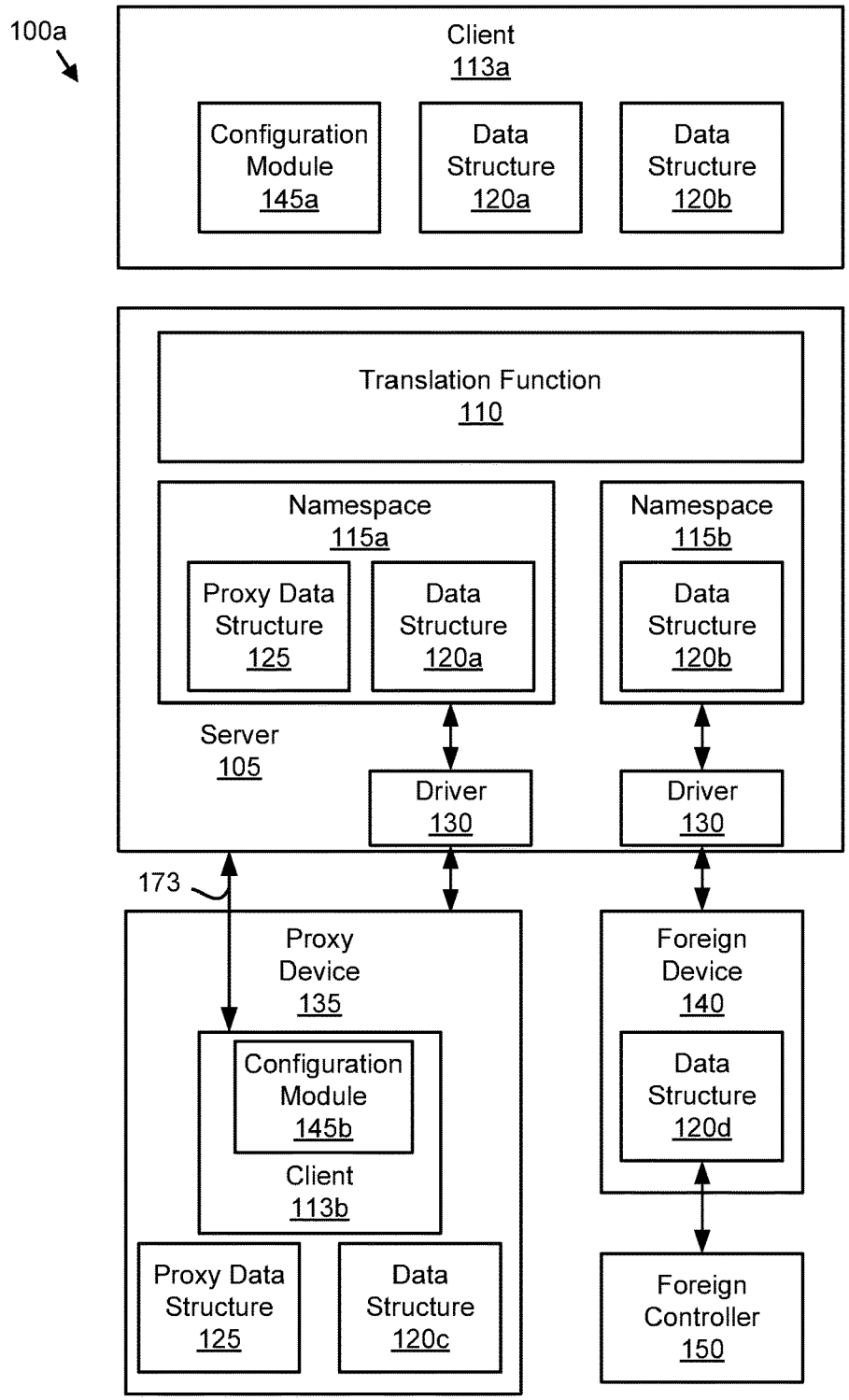
FIG. 1C is a schematic block diagram illustrating one alternate embodiment of a OPC UA system with a client and a proxy device and a foreign device.

FIG. 1C is a schematic block diagram illustrating one embodiment of an OPC UA data processing system 100*a* with the proxy device 135 and the foreign device 140. The system 100*a* may be the system 100*a* of FIG. 1B. In the depicted embodiment, the proxy device 135 includes an OPC UA client 113*b*. The client 113*b* may communicate with the server 105 using standard UA services 173. The client 113*b* may include a configuration module 145*b*.

Figure 1D:
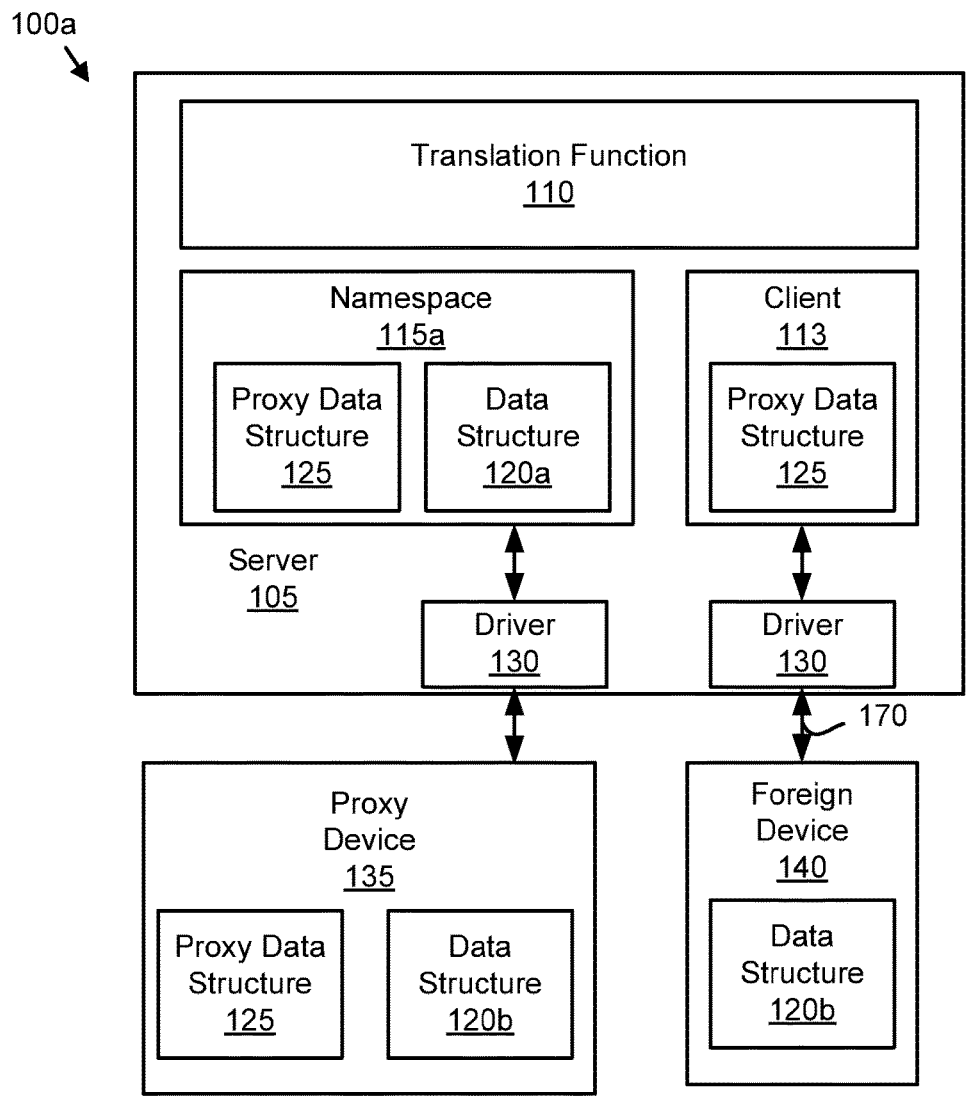
FIG. 1D is a schematic block diagram illustrating one embodiment of a OPC UA system with a proxy device and a foreign device.

FIG. 1D is a schematic block diagram illustrating one embodiment of an OPC UA system 100*a* with the proxy device 135 and the foreign device 140. In the depicted embodiment, no client 113 is in communication with the server 105. In one embodiment, the proxy device 135 does not include the configuration module 145.

Figure 1E:
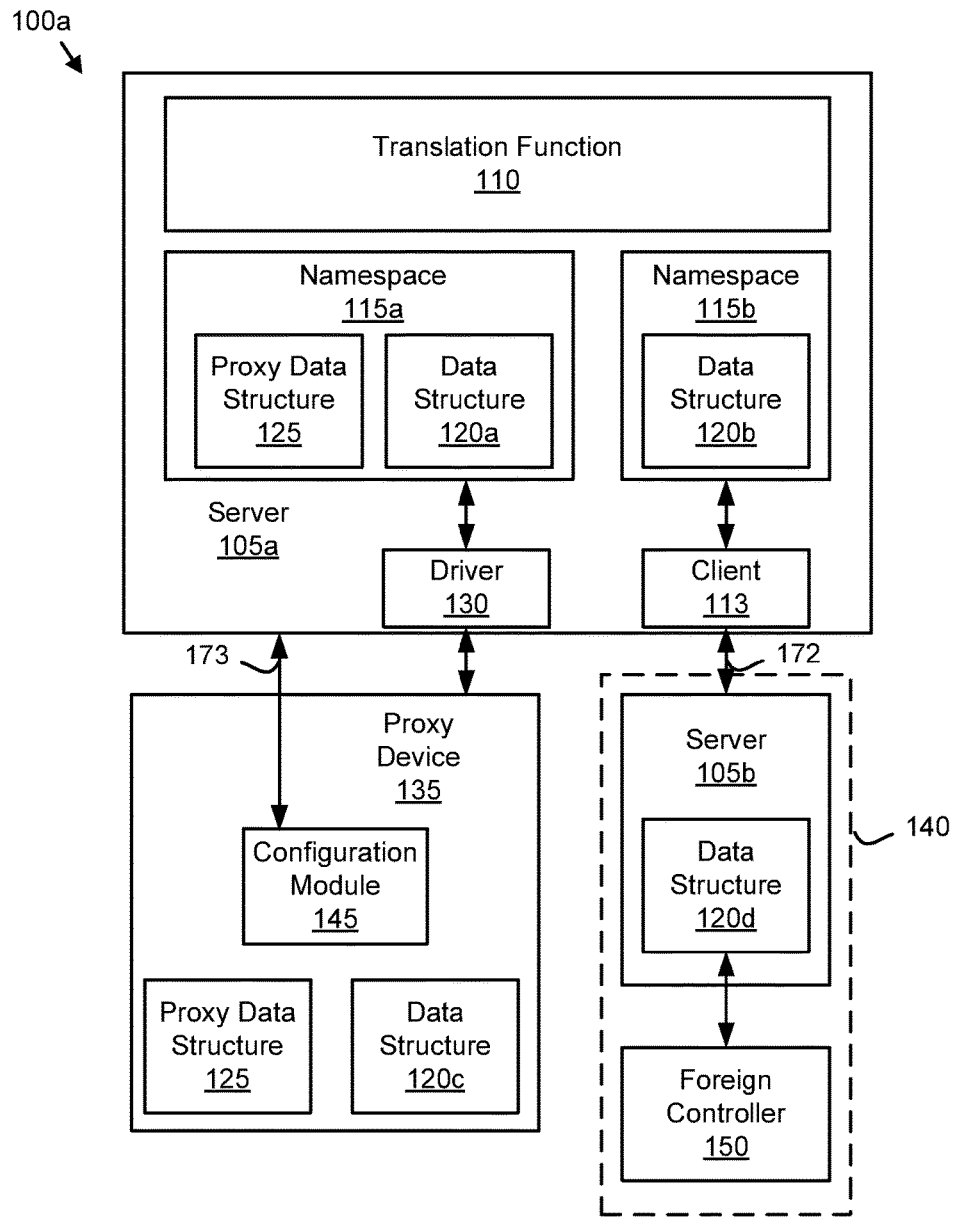
FIG. 1E is a schematic block diagram illustrating one alternate embodiment of a OPC UA system with a proxy device and a foreign device.

FIG. 1E is a schematic block diagram illustrating one alternate embodiment of an OPC UA data processing system 100*a*. The system 100*a* may be the system 100*a* of FIG. 1D. In the depicted embodiment, the foreign device 140 comprises an OPC UA server 105*b* and the foreign controller 150. The server 105*b* may store the fourth data structure 120*d*. In addition, the foreign device 140 may communicate 172 as an OPC UA server 105*a* through an OPC UA client 113. The configuration module 145 of the proxy device 135 may communicate with the server 105*a* using standard UA services 173.

Figure 1F:
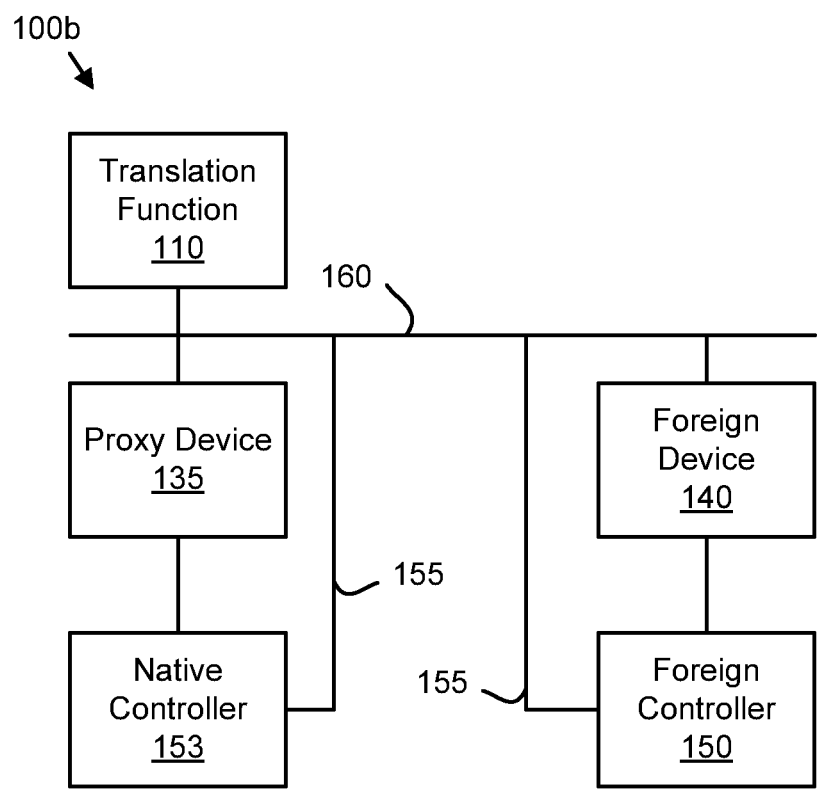
FIG. 1F is a schematic block diagram illustrating one embodiment of an energy management system.

FIG. 1F is a schematic block diagram illustrating one embodiment of an energy management data processing system 100*b*. The system 100*b* may be an embodiment of the system 100 of FIG. 1A. In the depicted embodiment, the proxy device 135 and the foreign device 140 are in communication over a communication channel 160. The communication channel 160 may be an Ethernet communication channel.

In one embodiment, the translation function 110 may also be in communication with communication channel 160. The translation function 110 may be embodied in a device such as a computer. The translation function 110 may communicate with the foreign device 140 using the domain specific communication stack.

The proxy device 135 may be managed by a native controller 153. The native controller 153 may communicate with the proxy device 135. In addition, the native controller 153 may include an interface 155 to the communication channel 160. The foreign device 140 may be managed by the foreign controller 150. The foreign controller 150 may include an interface 155 to the communication channel 160.

FIG. 1G is a schematic block diagram illustrating one alternate embodiment of an energy management data processing system 100*b*. In the depicted embodiment, the translation function 110 is embodied within the native controller 153.

FIG. 2A is a schematic block diagram illustrating one embodiment of translation data 200. The translation data 200 maybe organized as one or more data structures in a memory. In the depicted embodiment, the translation data 200 includes the proxy data structure 125, the translation function 110, one or more protocol specific structure converting functions 218, one or more protocol specific mapping functions 219, one or more native method callings 225, one or more foreign method callings 227, one or more method mapping functions 230, protocol reference data 233, a permission request 235, user-defined operations 275, operation parameters 280, an operation state machine 285, a state mapping table 290, foreign device information 295, the power level policy 293, and a power management command 283. The translation data 200 may be used to define domain specific method callings.

Figure 2B:
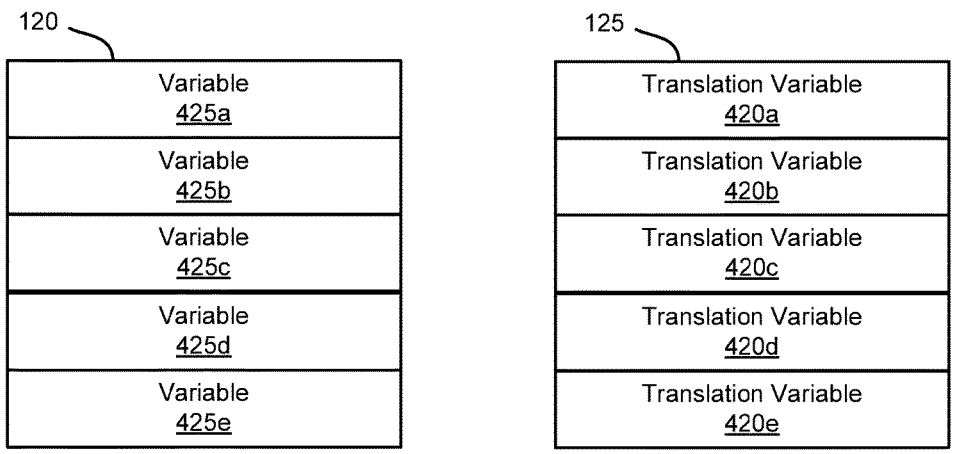
FIG. 2B is a schematic block diagram illustrating one embodiment of a data structure and a proxy data structure.
Figure 2C:
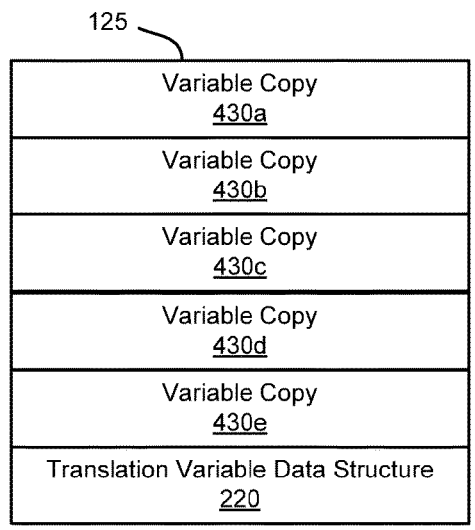
FIG. 2C is a schematic block diagram illustrating one alternate embodiment of a proxy data structure.

The proxy data structure 125 is described in more detail in FIGS. 2B-C. The translation function 110 is described in more detail in FIG. 3A. The translation function 110 may include the protocol specific structure converting functions 218 and the protocol specific mapping function 219.

The protocol specific structure converting functions 218 may link a native node in a foreign node in the native namespace 115*a* and the foreign namespace 115*b*. The protocol specific mapping functions 219 may map a native method calling 225 of the native node to a foreign method calling 227 of the foreign node.

The one or more native method callings 225 may each comprise a method calling that employs the native communication protocol. In one embodiment, the native node method calling 225 is a power management function and invokes the foreign node method calling 227 of the foreign node. The native method callings 225 may be OPC UA method callings.

The one or more foreign method callings 227 may each comprise a method calling that employs the foreign communication protocol. The foreign method callings 227 may not be OPC UA method callings. A foreign method calling 227 of the foreign node is invoked in response to translated data structure data. The translated data structure comprises one or more sensor data and state information from one or more foreign devices 140 in one or more foreign nodes. The native method callings 225 and foreign method callings 227 may be directed to the proxy device 135, the foreign device 140, and combinations thereof.

Each method mapping function 230 may map a native method calling 225 to a foreign method calling 227. The method mapping function 230 may be specific to a protocol such as the native communication protocol and/or the foreign communication protocol.

The protocol reference data 233 may identify protocol specific relationships between the native node and the foreign node under the address space. In addition, the protocol reference data 233 may store information about one or more communication protocols. The protocol reference data 233 may include communication protocol parameters, a communication protocol version number, and/or communication protocol address.

The permission request 235 may include data and commands for requesting permission to access a foreign device 140 from a foreign controller 150. The permission request 235 may be generated by the translation function 110.

The user-defined operations 275 may be performed by the proxy device 135, the foreign device 140, or combinations thereof. The user-defined operations 275 may be generated by and/or imported by a user such as an administrator. The operation parameters 280 may specify one or more parameters associated with the user-defined operations 275.

The operation state machine 285 may manage the performance of the user-defined operations 275. The operation state machine 285 may define one or more states and one or more transition conditions. In addition, the operation state machine 285 may define one or more actions for each of the states.

The state mapping table 290 may map data and operations of the data structure 120 for the foreign device 140 to the proxy data structure 125 of the proxy device 135. In one embodiment, the state mapping table 290 may map the data and operations of the data structure 120 in the foreign namespace 115*b* to the proxy data structure 125 in the native namespace 115*a*.

The foreign device information 295 may define information for the foreign device 140. In one embodiment, the foreign device information 295 is received in response to querying the foreign device 140. Alternatively, the foreign device information 295 may be received in response to identifying the foreign device 140 and retrieving information associated with the foreign device 140.

The power level policy 293 may specify criteria for modifying a power level in a device such as the proxy device 135 and/or the foreign device 140. The modification may reduce the power level. In one embodiment, the power level policy 293 is satisfied if an occupancy is less than occupancy threshold. In addition, the power level policy 293 may be satisfied in response to one or more of satisfying the safety criterion, satisfying a calendar criterion, and satisfying a time criterion. The safety criterion may be satisfied in response to no human occupation. The calendar criterion may be satisfied for a weekend and/or a holiday. The time criterion may be satisfied after regular work hours.

Alternatively, the power level policy 293 may specify criteria for increasing the power level in the device. The power level policy 293 may be satisfied if the occupancy is greater than the occupancy threshold. The power management command 283 may be a command directed to a foreign device 140 that instructs the foreign device 142 perform a power management function.

FIG. 2B is a schematic block diagram illustrating one embodiment of the data structure 120 and the proxy data structure 125. The data structure 120 and the proxy data structure 125 maybe organized in a memory. In the depicted embodiment, the data structure 120 includes a plurality of variables 425. The proxy data structure 125 includes a plurality of translation variables 420. In one embodiment, one or more translation variables 420 of the proxy data structure 125 correspond to each variable 425 of the data structure 120. The translation variables 420 may be organized as OPC Unified Architecture (UA) Variable Nodes with domain specific structured data types.

FIG. 2C is a schematic block diagram illustrating one alternate embodiment of a proxy data structure 125. In the depicted embodiment, the proxy data structure 125 includes a variable copy 430 of each variable 425 of the data structure 120. In addition, the proxy data structure 125 may include a translation variable data structure 220 that includes each of the translation variables 420 of FIG. 2B.

Figure 2D:
FIG. 2D is a schematic block diagram illustrating one embodiment of a power management communication framework.

FIG. 2D is a schematic block diagram illustrating one embodiment of a power management communication framework 231. The framework 231 maybe organized as a data structure in a memory. In the depicted embodiment, the framework 231 includes a first actor 325, a transaction type 330, a second actor 335, an action type 340, an action parameter 345, and a parameter value 350. The first actor 325 may identify a first device such as the proxy device 135 and/or the foreign device 140. The second actor 335 identifies a second device. The transaction type 330 may specify a type of transaction between the first actor 325 and the second actor 335. The action type 340 may specify the action that is performed for the transaction. The action parameter 345 may specify a parameter for the action. The parameter value 350 may specify a value for the action parameter 345.

Figure 3A:
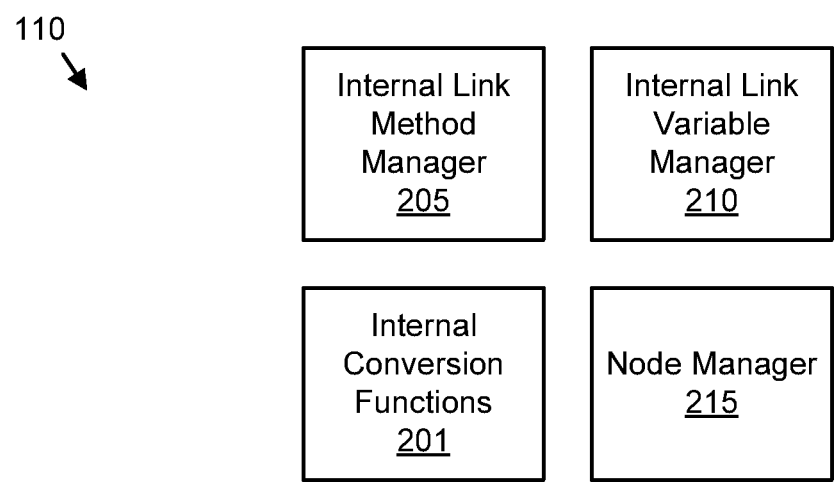
FIG. 3A is a schematic block diagram illustrating one embodiment of a translation function.

FIG. 3A is a schematic block diagram illustrating one embodiment of a translation function 110. In the depicted embodiment, the translation function 110 includes an internal link method manager 205, an internal link variable manager 210, a node manager 215, and internal conversion functions 201.

The internal link method manager 205 may manage method calls between one or more native domain nodes and one or more foreign domain nodes. The internal link method manager 205 may generate one or more OPC UA method calls.

The internal link variable manager 210 may manage the translation of the variables 425 to the translation variables 420 and the translation of the translation variables 420 to the variables 425. In one embodiment, the internal link variable manager 210 creates an internal session that subscribes to one or more foreign nodes.

The node manager 215 may create and/or remove one or more OPC UA nodes. In addition, the node manager 215 may create and/or remove the protocol reference data 233. In one embodiment, the node manager 215 may read and/or write attributes, parameters, and the like for the one or more nodes. In one embodiment, the translation data 200 is embodied within the internal conversion functions 201.

Figure 3B:
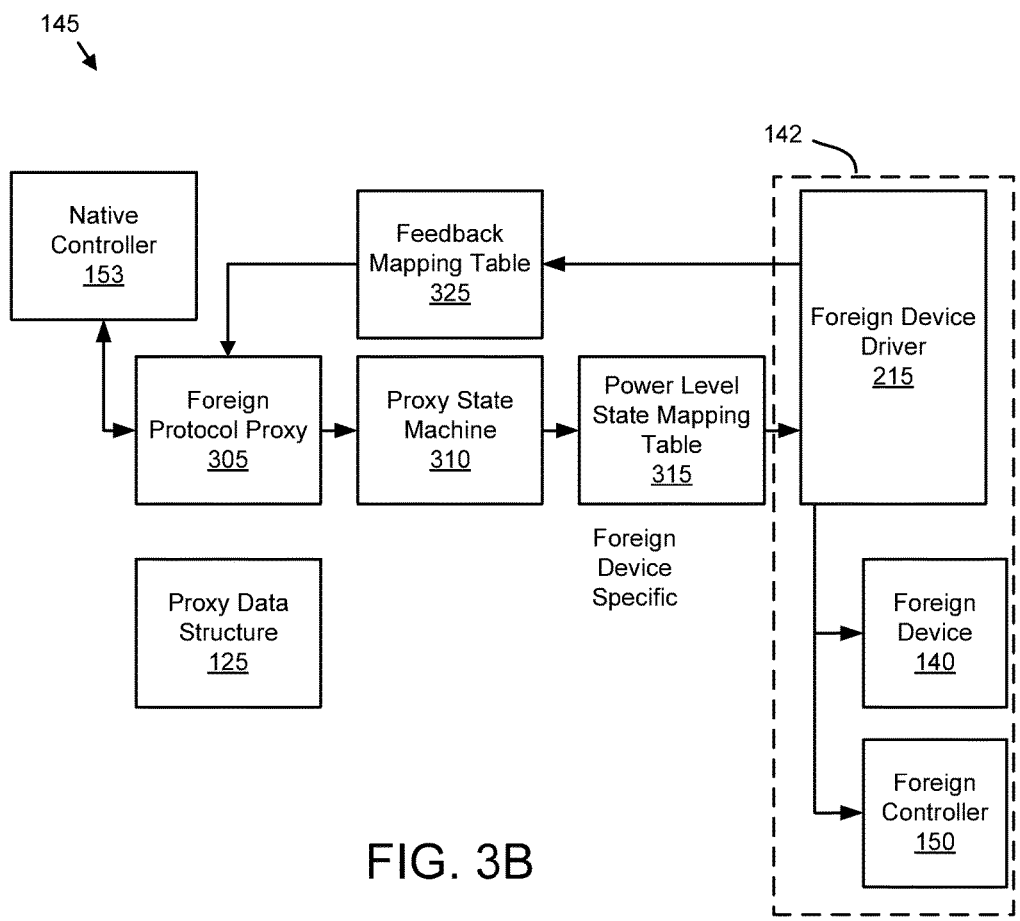
FIG. 3B is a schematic block diagram illustrating one embodiment of the configuration module.

FIG. 3B is a schematic block diagram illustrating one embodiment of the configuration module 145. In the depicted embodiment, the configuration module 145 includes a native controller 153, a foreign protocol proxy 305, a feedback mapping table 325, a proxy state machine 310, a power level state mapping table 315, and the proxy data structure 125. The native controller 153 may be a native energy management controller. The configuration module 145 is depicted in communication with a foreign device interface 142 that includes a foreign device driver 215, the foreign device 140, and the foreign controller 150. The configuration module 145 may perform energy management functions for the client 113, the proxy device 135, the server 105, and/or the foreign device 140.

In one embodiment, the foreign protocol proxy 305 receives a native method calling 225 from the native controller 153. The form protocol proxy 305 may select a first proxy state machine state that corresponds to the native method calling 225. The proxy state machine 310 may sequence through one or more states that correspond to steps of the method calling. The power level state mapping table 315 may map the states of the proxy state machine 310 to communications to the foreign device interface 142 and/or the foreign device driver 215. The foreign device driver 215 may employ a foreign protocol to communicate with the foreign device 140 and/or foreign controller 150.

The feedback mapping table 325 may receive communications from the foreign device driver 215 and/or foreign device interface 142. The feedback mapping table 325 may translate the communications from the foreign device driver 215 and/or foreign device interface 142 for the foreign protocol proxy 315. The foreign protocol proxy 305 may modify states of the proxy state machine 310 based on the translated communications.

The proxy state machine 310 may represent the power management functions of the foreign device 140 with sequences of states. By executing the states in response to the native method calling 225 from the native controller 153, the proxy state machine 310 may accurately translate the native method calling 225 to a corresponding foreign method calling 227. In one embodiment, the states of the proxy state machine 310 correspond to a foreign power level state machine that resides on the foreign device 140.

Figure 3C:
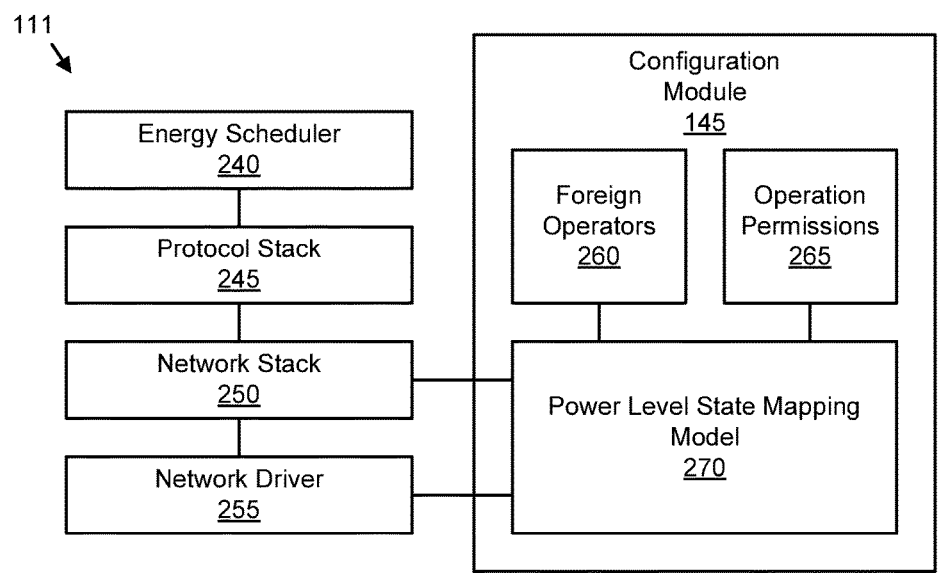
FIG. 3C is a schematic block diagram illustrating one embodiment of configuration module/translation function communication stack interaction.

FIG. 3C is a schematic block diagram illustrating one embodiment of configuration module 145 and translation function communication stack interaction. The translation function 110 may be embodied in a native energy management controller such as the native controller 153 and may include a communication stack 111. The communication stack 111 includes an energy scheduler 240, a protocol stack 245, a network stack 250, and a network driver 255.

A native energy management controller may communicate one or more power management method callings for the energy scheduler 240. The protocol stack 245 may generate a series of commands and/or communications from the power management method calling.

The powers level state mapping model 270 may receive the commands and/or communications from the network stack 250. In one embodiment, the power level state mapping model 270 may determine that an operation permission 265 is needed from the foreign server 150 in order for the foreign device 140 to perform the commands and/or communications. The power level state mapping model 270 may communicate with the foreign controller 150 through the network driver 255 to request the needed operation permission 265. The power level state mapping model 270 may further receive the operation permission 265.

The power level state mapping model 270 may select one or more foreign operators 260 that correspond to the commands and/or communications from the protocol stack 245 and communicate the foreign operators 260 through the network driver 255 to the foreign device 140, causing the foreign device 140 to perform the power management method calling. In one embodiment, the power level state mapping model 270 only communicates the foreign operators 260 after receiving the operation permission 265.

Figure 3D:
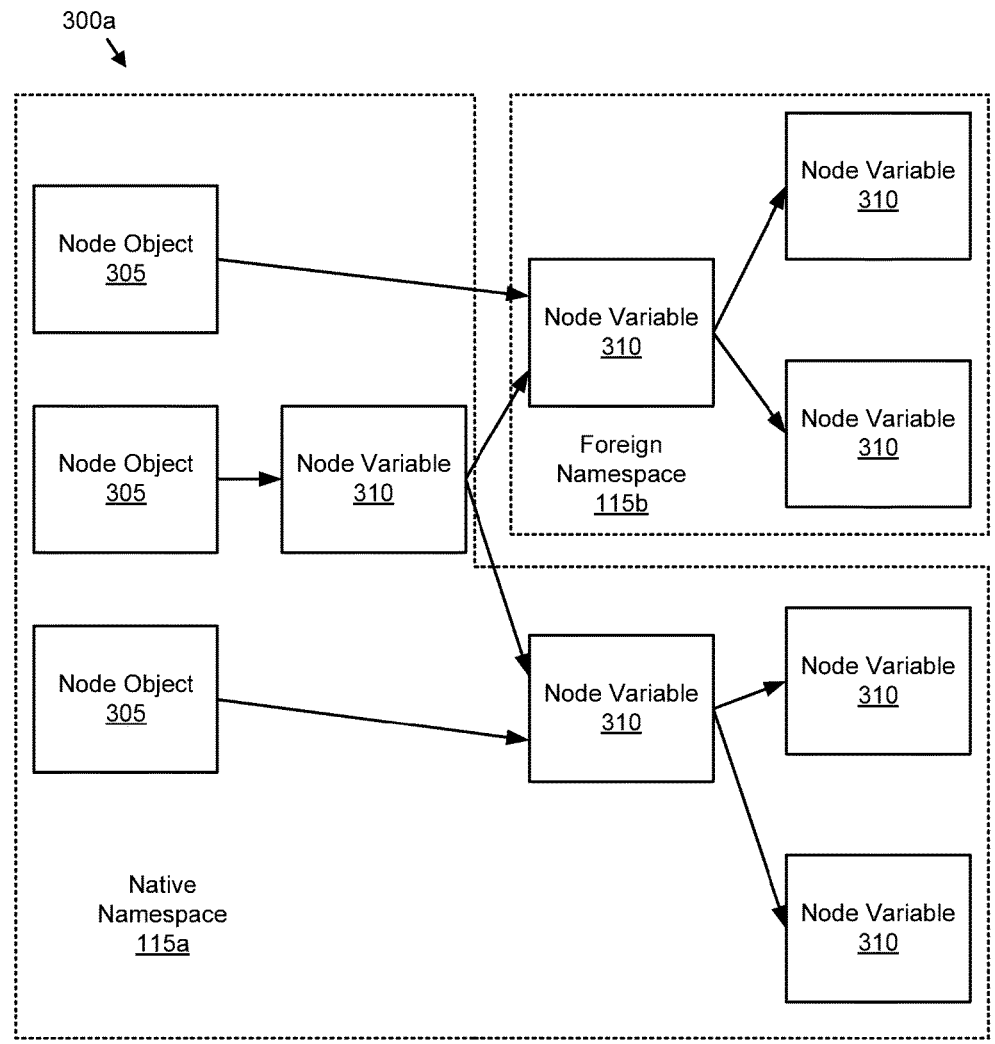
FIG. 3D is a schematic block diagram illustrating one embodiment of an address space.

FIG. 3D is a schematic block diagram illustrating one embodiment of an address space 300a. In one embodiment, the address space 300a is organized on an OPC UA server 105 and may comply with the OPC UA specification as of the filing of the present application. In the depicted embodiment, the address space 300a includes the native namespace 115a and the foreign namespace 115b.

In the depicted embodiment, the native namespace 115a includes one or more node objects 305. The node objects 305 may be OPC UA node objects. Each node objects 305 may be in communication with one or more node variables 310. The node variables 310 may be OPC UA node variables. Each node variable 310 may be in communication with one or more additional node variables 310. In one embodiment, the data structures 120 and/or proxy data structures 125 may be embodied in node variables 310.

The node objects 305 and node variables 310 in the native namespace 115a may be native nodes. The node variables 310 in the foreign namespace 115b may be foreign nodes. An OPC UA server 105 may maintain a plurality of native nodes and a plurality of foreign nodes.

The address space 300a may be used for translating variables 425 to translated variables 420 and translating native method callings 225 to foreign method callings 227. In addition, the address space 300a may be used to translate translated variables 420 to variables 425 and translate foreign method calls 227 to native method callings 225.

Figure 3E:
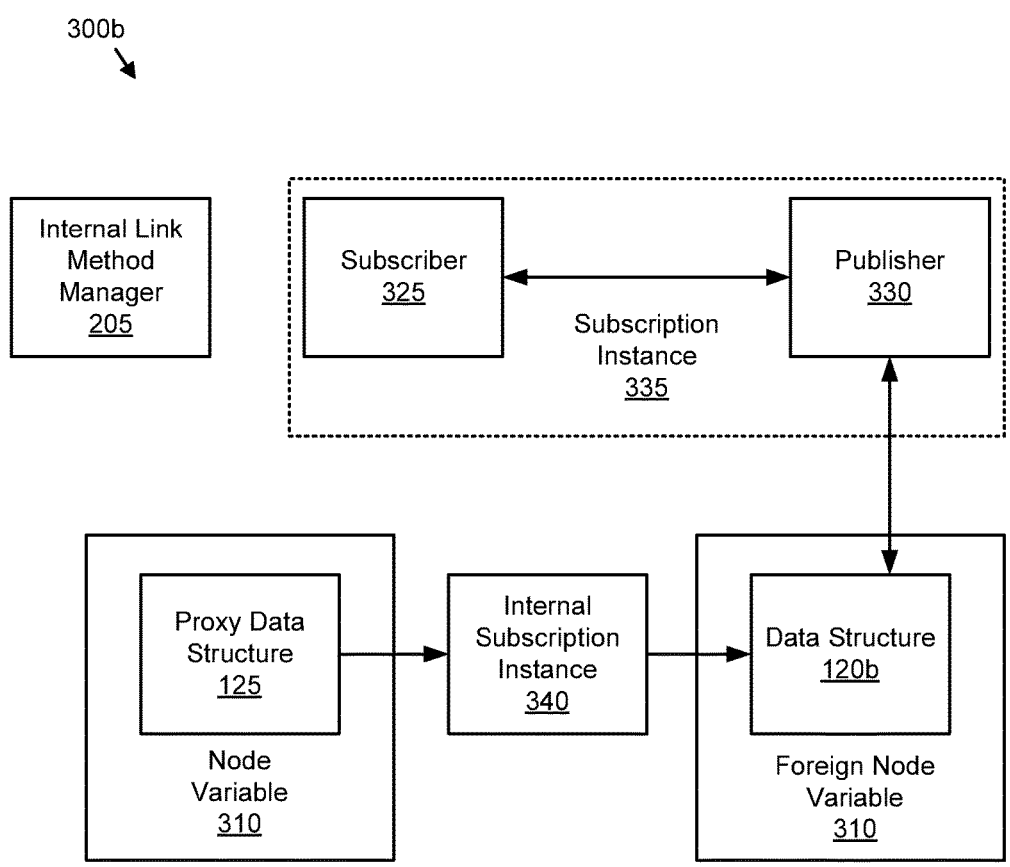
FIG. 3E is a schematic block diagram illustrating one alternate embodiment of an address space.

FIG. 3E is a schematic block diagram illustrating one alternate embodiment of an address space 300b. In the depicted embodiment, the address space 300b is organized as an OPC UA address space on an OPC UA server 105. The internal link method manager 205 may create a subscription instance 335. The subscription instance 335 may include a publisher 330 that is in communication with a second data structure 120b of a foreign node variable 310. The subscription instance 335 may further include a subscriber 325.

The publisher 330 may detect a modification to the second data structure 120b and notify the subscriber 325 of the modification. In response to the subscriber 325 receiving the notification, the translation function 110 may translate the second data structure 120b and/or the modified portion of the second data structure 120b to the proxy data structure 125.

In one embodiment, the internal link method manager 205 may create an internal subscription instance 340 that monitors the proxy data structure 125. The proxy data structure 125 may reside in the a variable 310 of the address space 300. In one embodiment, the internal subscription instance 340 may detect a modification in the proxy data structure 125. The internal subscription instance 340 and/or translation function 110 may update the second data structure 120b in response to the modification.

Figure 3F:
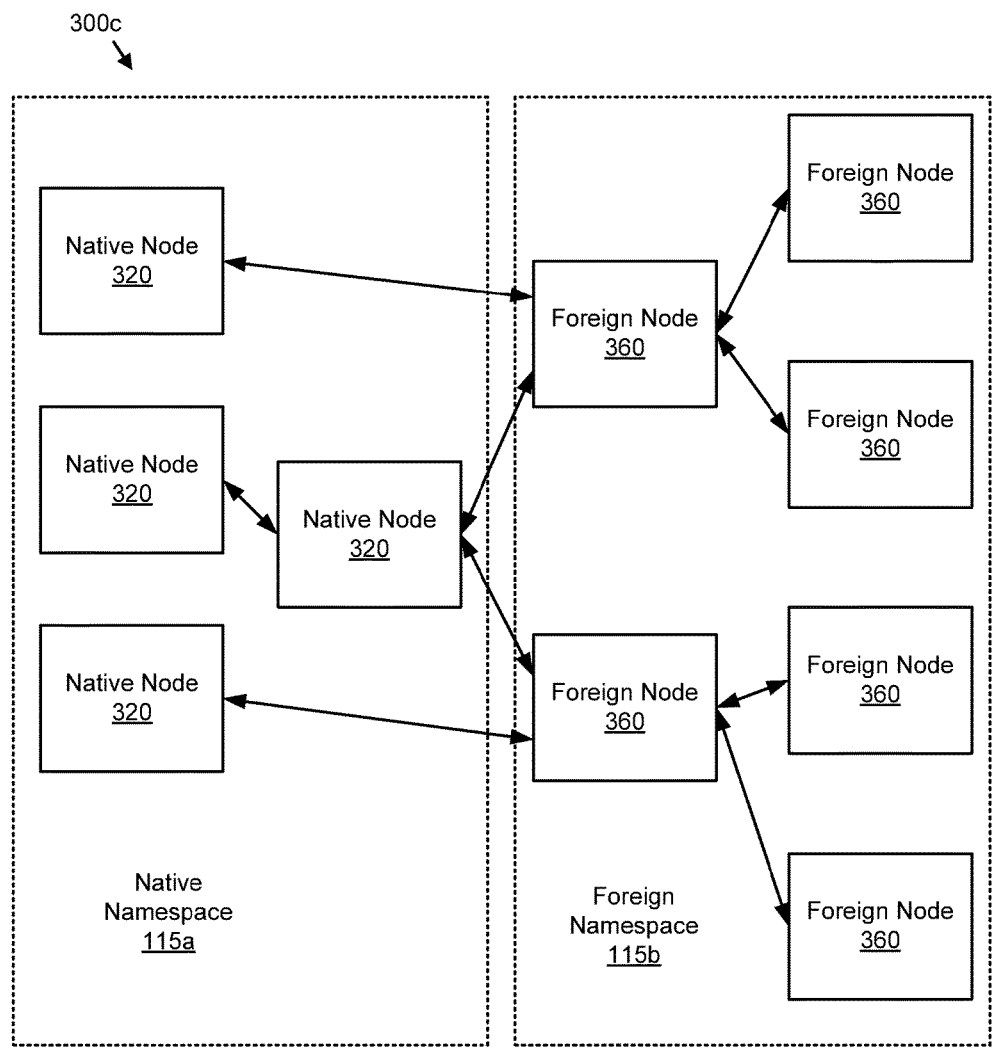
FIG. 3F is a schematic block diagram illustrating one alternate embodiment of an address space.

FIG. 3F is a schematic block diagram illustrating one alternate embodiment of an address space 300c. The address space 300c includes the native namespace 115a and the foreign namespace 115b. The native namespace 115a includes a plurality of native nodes 320. A native node 320 may include the proxy data structure 125. The proxy data structure 125 may be defined with the native protocol and represent information of the proxy device 135 in the native namespace 115a. The foreign namespace 115b includes a plurality of foreign notes 360. A foreign node may include the foreign data structure 120. The foreign data structure 120 may be defined with the foreign protocol and may represent information of the foreign device 140 in the foreign namespace 115b. The native node 320 and the foreign node 260 may each be node variables 310. In an alternative embodiment, the native node 320 and/or the foreign node 360 may be node objects 305.

Figure 4:
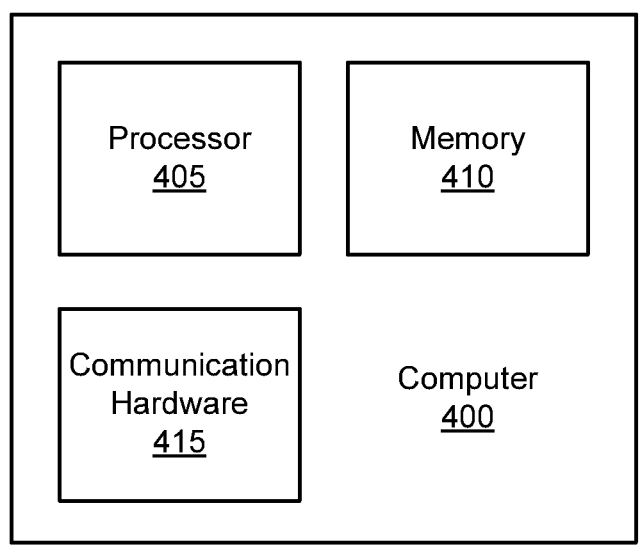
FIG. 4 is a schematic block diagram illustrating one embodiment of a computer.

FIG. 4 is a schematic block diagram illustrating one embodiment of a computer 400. The server 105, client 113, proxy device 135, foreign device 140, foreign controller 150, the native controller 153 may each include a computer 400. In the depicted embodiment, the computer 400 includes a processor 405, a memory 410, and communication hardware 415. The memory 410 may comprise a semiconductor storage device, a hard disk drive, an optical storage device, a micromechanical storage device, or combinations thereof. The memory 410 may store code. The processor 405 may execute the code. The communication hardware 415 may communicate with other devices using one or more communication protocols.

Figure 5A:
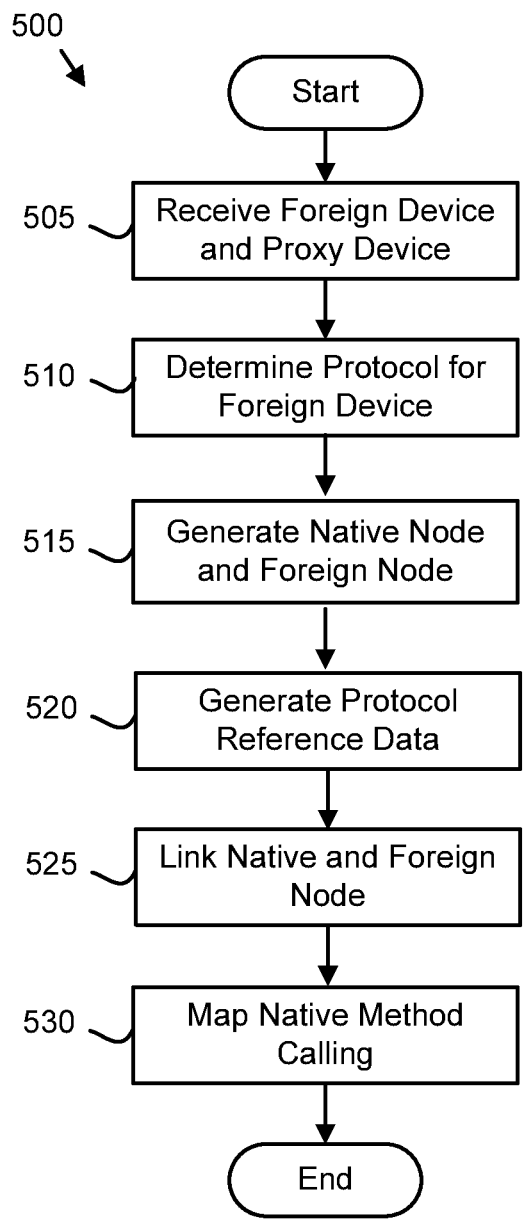
FIG. 5A is a schematic flow chart diagram illustrating one embodiment of a foreign device linking method.

FIG. 5A is a schematic flow chart diagram illustrating one embodiment of a foreign device linking method 500. The method 500 may link one or more foreign devices 140 with one or more proxy devices 135. The method 500 may be performed by a processor 405. Alternatively, the method 500 may be performed by a memory 410 storing code that is executed by the processor 405 to perform the method 500.

The method 500 starts, and in one embodiment, the code receives 505 a pairing of the foreign device 140 and the proxy device 135. The foreign device 140 and the proxy device 135 may be paired by dragging an icon representing the foreign device 140 to icon representing the proxy device 135. Alternatively, the foreign device 140 and the proxy device 135 may be paired by dragging the icon representing the proxy device 135 to the icon representing the foreign device 140. In a certain embodiment, the foreign device 140 and the proxy device 135 are paired by a configuration file. The pairing may associate one or more foreign devices 140 with one or more proxy devices 135.

The code may determine 510 a protocol and application information for the foreign device 140. The application information may include foreign device specific information required by the proxy device 135. In one embodiment, the code queries the foreign device 140 for a foreign device identifier. The code may use the foreign device identifier to retrieve the foreign device protocol and the application information from a database. Alternatively, the code may query the foreign device 140 for the foreign device protocol and application information.

In one embodiment, the code generates 515 the native node 320 and the foreign node 360 in response to determining the protocol and the application information of the foreign device 140. The code may generate 515 a set of native nodes 320 and a set of foreign nodes 360. The native node 320 and the foreign node 360 may be generated 515 in the address space 300. The native node 320 may comprise one or more data structures 120. The native node 320 may include the proxy data structure 125. The proxy data structure 125 may be defined with the native protocol and may represent information of the proxy device 135 in the native namespace 115a. The foreign node 360 may comprise one or more data structures 120. The data structures 120 may represent information of the foreign device 140 in the foreign namespace 115b.

The code may generate 520 the protocol reference data 233. The protocol reference data 233 may identify protocol specific relationships between the native node 320 and the foreign node 360 under the address space 300.

The code may link 525 the native node 320 and the foreign node 360 in the native namespace 115a and the foreign namespace 115b by the translation function 110. The translation function 110 may automatically convert information between the foreign data structure 120 and the proxy data structure 125 using the protocol specific structure converting functions 218. In one embodiment, the protocol specific structure converting functions 218 generate a translation variable 420 in the proxy data structure 125 for each variable 425 in the data structure 120 of the foreign namespace 115b as illustrated in FIG. 2B. Each translation variable 420 may have the same type, formatting, and privileges as the corresponding variable 425.

In one embodiment, the protocol specific structure converting functions 218 map power level mappings between the proxy device 135 and the foreign device 140. In an alternate embodiment, the proxy data structure 125 may include a variable copy 430 of each variable 425. In addition, the proxy data structure 125 may include the transition variable data structure 220 with the translation variables 420 that correspond to the variables 425 is illustrated in FIG. 2C.

In one embodiment, the code maps 530 a native method calling 225 of the native node 320 to a foreign method calling 227 of the foreign node 360 using the protocol specific method mapping function 219 and the method 500 ends. The protocol specific method mapping in function 219 may modify outputs from the native method calling 225 to be compatible with inputs of the foreign method calling 227.

Figure 5B:
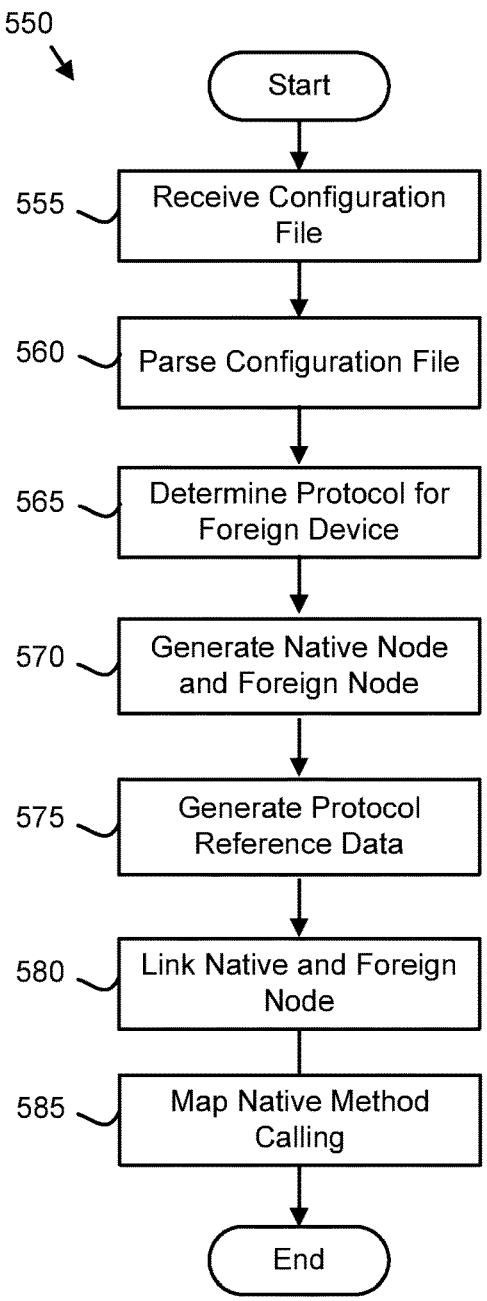
FIG. 5B is a schematic flow chart diagram illustrating one alternate embodiment of a foreign device linking method.

FIG. 5B is a schematic flow chart diagram illustrating one alternate embodiment of a foreign device linking method 550. The method 550 may link one or more foreign devices 140 with one or more proxy devices 135. The method 550 may be performed by a processor 405. Alternatively, the method 550 may be performed by a memory 410 storing code that is executed by the processor 405 to perform the method 550.

The method 550 starts, and in one embodiment, the code receives 555 a configuration file such as an extensible markup language (XML) file. The code may further parse 560 the configuration file. In one embodiment, the code determines 565 the protocol for the foreign device 140 from the configuration file.

In one embodiment, the code generates 570 the native node 320 and the foreign node 360 in response to determining the protocol of the foreign device 140. The native node 320 may comprise one or more data structures. The native node 320 may include the proxy data structure 125. The proxy data structure 125 may be defined with the native protocol and may represent information of the proxy device 135 in the native namespace 115a. The foreign node 360 may comprise one or more data structures 120. The data structures 120 may represent information of the foreign device 140 in the foreign namespace 115b.

In one embodiment, the code may configure the translation function 110 of the OPC UA server 105 by generating UA nodes such as UA node objects 305 and UA Node variables 310 of the proxy data structure 125 and the foreign second data structure 120b from the configuration file.

The code may generate 575 the protocol reference data 233. The protocol reference data 233 may be retrieved from the XML file. The code may link 580 the native node 320 and the foreign node 360 in the native namespace 115a and the foreign namespace 115b by the translation function 110. The translation function 110 may automatically convert information between the foreign data structure 120 and the proxy data structure 125 using the protocol specific structure converting functions 218. In one embodiment, the protocol specific structure converting functions 218 generate a translation variable 420 in the proxy data structure 125 for each variable 425 in the data structure 120 of the foreign namespace 115b as illustrated in FIG. 2B. Each translation variable 420 may have the same type, formatting, and privileges as the corresponding variable 425.

In alternate embodiment, the proxy data structure 125 may include a variable copy 430 of each variable 425. In addition, the proxy data structure may include the transition variable data structure 220 with the translation variables 420 that correspond to the variables 425 is illustrated in FIG. 2C.

In one embodiment, the code maps 585 a native method calling 225 of the native node 320 to a foreign method calling 227 of the foreign node 360 using the protocol specific method mapping function 219 and the method 550 ends. The protocol specific method mapping function 219 may modify outputs from the native method calling 225 to be compatible with inputs of the foreign method calling 227.

Figure 5C:
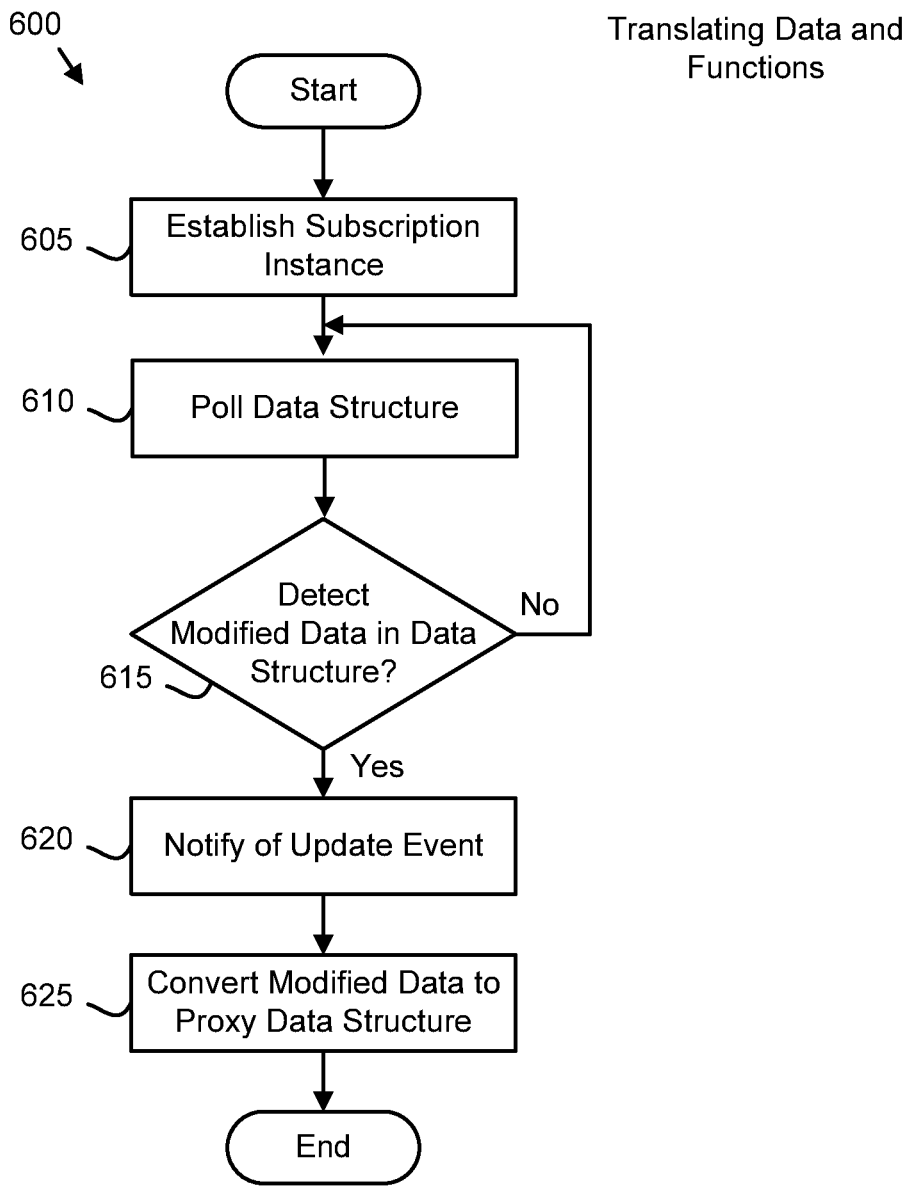
FIG. 5C is a schematic flowchart diagram illustrating one embodiment of a data translation method.

FIG. 5C is a schematic flowchart diagram illustrating one embodiment of a data translation method 600. The method 600 may translate variables 425 of the data structure 120 to translation variables 420 of the proxy data structure 125 and translate the translation variables 420 to the variables 425. The method 600 may be performed by a processor 405. Alternatively, the method 600 may be performed by a memory 410 storing code that is executed by the processor 405 to perform the method 600.

The method 600 starts, and in one embodiment, the code establishes 605 the internal subscription instance 355 with the publisher 330 and the subscriber 325 as shown in FIG. 3E. The publisher 330 may poll 610 the foreign data structure 120. The publisher 330 may detect modified data in response to a change in a variable 425 of the foreign data structure 125. If the publisher 330 detects 615 modified data in the foreign data structure 120, the publisher 330 may notify the subscriber 325 of an update event. If the publisher 330 does not detect 615 modified data, the publisher 330 continues to poll 610 the foreign data structure 120.

The translation module 110 may convert 625 the modified data of the foreign data structure 122 the proxy data structure 125 in response to the update event and the method 600 ends. In one embodiment, the translation module 110 employees a protocol specific structure converting function 218 specific to the variable 425 to convert 625 the modified data of the variable 425. The translation module 110 may automatically convert the foreign data structure variables 425 to the proxy data structure translation variables 420 and the proxy data structure translation variables 420 to the foreign data structure variables 425 by calling a conversion function from the protocol specific structure converting function 218 that converts a pair of data types between the data structure 120 and the proxy data structure 125.

Figure 5D:
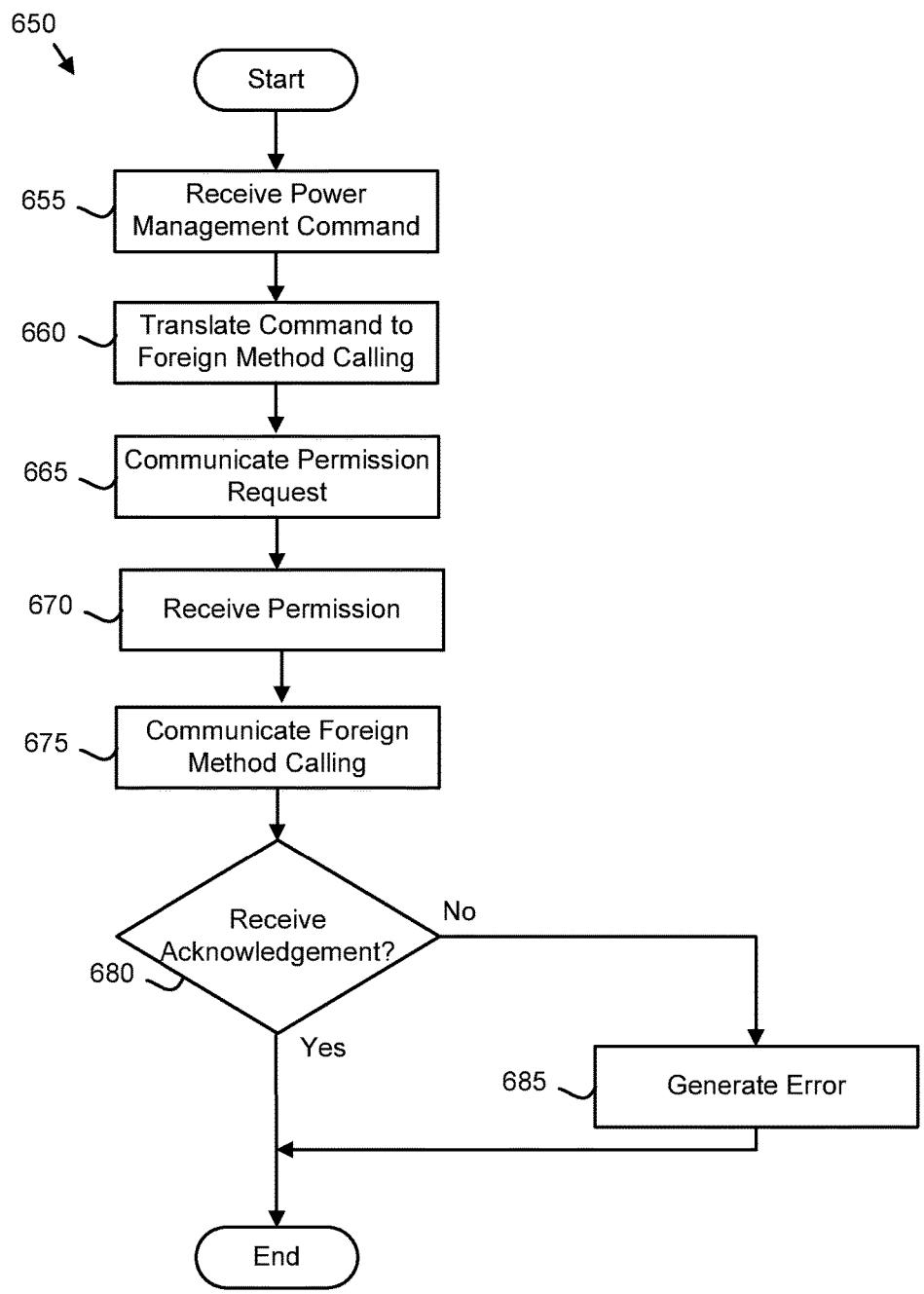
FIG. 5D is a schematic flowchart diagram illustrating one embodiment of a power management method.

FIG. 5D is a schematic flowchart diagram illustrating one embodiment of a power management method 650. The power management method 650 may manage power consumption for a foreign device 140. The power management method 650 may be performed by the processor 405. Alternatively, the power management method 650 may be performed by a memory 410 storing code that is executed by the processor 405 to perform the method 650.

The method 650 starts, and in one embodiment, the code receives 655 a power management command 283. The power management command 283 may be received at the translation function 110, the proxy device 135, the native controller 153, the client 113, or combinations thereof. The power management command 283 may be directed to the foreign device 140. The power management command 283 may initiate a power management function that modifies a power level of the foreign device 140 to a modified power level if a modified power level satisfies the power level policy 293. The modified power level may comprise one or more of reduced lighting and reduced heating, ventilation, and air conditioning (HVAC) settings.

In one embodiment, the power levels comprise active, reduced, and inactive power levels. Power levels may be predefined standard levels or user defined levels.

The code may translate 660 the power management command 283 to a foreign method calling 227. The foreign method calling 227 may be specific to the foreign device 140. In one embodiment, the foreign method calling 227 is a power management function. In one embodiment, the native controller 153 employs the foreign protocol proxy 305, the proxy state machine 310, the power level state mapping table 315, and the feedback mapping table 325 to translate 660 the power management command 283 to the foreign calling method 227.

Alternatively, the translation function 110 may employ the method mapping functions 230 to translate 660 the power management command 283 to the foreign calling method 227.

In one embodiment, the code communicates 665 a permission request 235 to a foreign controller 150. The foreign controller 150 may be an industrial automation controller, a building automation controller, and/or domain specific supervisor. The permission request 235 may be communicated 660 in response to the power management command 283. In one embodiment, the permission request 235 is communicated 660 through the interface 155 to the communication channel 160. The permission request 235 may include an identifier for the foreign method calling 227. The foreign controller 150 may identify the foreign method calling 227 from the identifier and determine whether to grant permission for the foreign method calling 227. The permission grant may be generated based on a state of a domain specific application associated with the foreign controller 150.

The code may receive 670 a permission from the foreign controller 150 and may communicate 675 the foreign method calling 227 to the foreign device 140. The foreign method calling 227 may be communicated with a low power communication. In one embodiment, the foreign method calling 227 is communicated 675 as the power management communication framework 231. The foreign method calling 227 may be communicated 675 using the domain specific protocol 170. Alternatively, the foreign method calling 227 may be communicated 675 from an OPC UA server 150. In addition, the foreign method calling 227 be communicated 675 through an OPC UA client 113.

The code may determine 680 if an acknowledgment is received from the foreign device 140. If no acknowledgment is received, the code may generate 685 an error and the method 650 ends. If the acknowledgment is received, the method 650 ends.

The embodiments generate a native node 320 with the proxy data structure 125 to find with the native protocol. The embodiments further generate a foreign node 360 with the foreign second data structure 120b defined with a foreign protocol. The embodiments further generate the protocol reference data 233 and link the native node 320 and the foreign node 360 in the address space 300 and link the native node 320 and the foreign node 360 in the native namespace 115a and the foreign namespace 115b by the translation function 110. The translation function 110 may automatically convert information between the foreign second data structure 120b and the proxy data structure 125 using the protocol specific structure converting functions 218. The embodiments further map a native method calling 225 of the native node 320 to a foreign method calling 227 of the foreign node using the protocol specific method mapping function 219. As a result, the links and translation functions are organized to translate information from the foreign device 140 and to issue foreign method callings 227 to the foreign device 140.

The described examples and embodiments are to be considered in all respects only as illustrative and not restrictive. This written description uses examples and embodiments to disclose the invention, including best mode, and also to enable any person skilled in the art to practice the invention, including making and using any devices or systems and performing any incorporated methods. The examples and embodiments may be practiced in other specific forms. The patentable scope of this invention is defined by the claims and may include other examples that occur to those skilled in the art. Such other examples are intended to be within the claims if they have structural elements that do not differ from the literal language of the claims, or if they include equivalent structural element with insubstantial differences from the literal languages of the claims.

What is claimed is:

1. A method comprising:
generating, by use of a processor, a native node comprising a proxy data structure that is defined with a native protocol and that represents information of a proxy device in a native namespace, and a foreign node comprising a foreign data structure that is defined with a foreign protocol and that represents information of a foreign device in a foreign namespace, wherein the proxy device communicates in a Common Industrial Protocol (CIP) and the foreign device communicates in a non-CIP protocol;
generating protocol reference data that identifies protocol specific relationships between the native node and the foreign node under an address space;
linking the native node and the foreign node in the native namespace and the foreign namespace by a translation function that automatically converts information between the foreign data structure and the proxy data structure using protocol specific structure converting functions;
mapping a native method calling of the native node to a foreign method calling of the foreign node using a protocol specific method mapping function, wherein the native node method calling is a power management function operating on an energy scheduler that schedules power, and invokes the foreign node method calling of the foreign node;
receiving a power management command from a network stack of a communications stack comprising the network stack, a network driver, and the energy scheduler, wherein the power management command modifies a power level of the foreign device, the communication stack manages a translation function for the power management command, and the network stack receives the power management command for a power level state mapping model;
selecting foreign operators that correspond to the power management command with the power level state mapping model;
translating the power management command into the foreign method calling using a foreign protocol proxy;
communicating the foreign calling method to the energy scheduler and through the network driver to the foreign device; and
in response to receiving a grant permission at the power level state mapping model from a foreign controller that manages the foreign device, communicating the foreign method calling to the foreign device.

2. The method of claim 1, wherein the proxy data structure comprises translation variables that correspond to variables of the foreign data structure of the foreign node.

3. The method of claim 2, wherein the translation variables are organized as OPC Unified Architecture (UA) Variable Nodes with domain specific structured data types.

4. The method of claim 1, wherein the address space is an OPC Unified Architecture (UA) address space and an OPC UA server maintains a plurality of native nodes and a plurality of foreign nodes.

5. The method of claim 1, wherein the translation function comprises a network of domain specific OPC Unified Architecture (UA) nodes in the OPC UA server address space, the address space comprises a node network, and nodes of the node network of Object, Variable, Method and Reference types are interconnected.

6. The method of claim 1, wherein the translation function automatically converts the foreign data structure variables to the proxy data structure translation variables and the proxy data structure translation variables to the foreign data structure variables by calling a conversion function that converts a pair of data types between the data structure and the proxy data structure.

7. The method of claim 5, wherein the translation function automatically links the information of the proxy device and the information of the foreign device by:
   establishing a subscription instance with a publisher and a subscriber;
   detecting modified data in the foreign data structure in response to the publisher polling the foreign data structure;
   notifying of an update event from the publisher to the subscriber; and
   converting the modified data to the proxy data structure in response to the update event.

8. The method of claim 1, the method further comprising dynamically configuring translation functions of an OPC Unified Architecture (UA) server by:
   receiving a pairing of the foreign device and the proxy device by UA messages;
   determining a protocol and application information for the foreign device, wherein the application information comprises foreign device specific information required by the proxy device; and
   generating the native node and the foreign node in response to determining the protocol and the application information of the foreign device.

9. The method of claim 1, the method further comprising statically configuring translation functions of an OPC Unified Architecture (UA) server by generating UA nodes of the proxy data structure and the foreign data structure from a parsed Extensible Markup Language (XML) file.

10. The method of claim 1, the method further comprising communicating a permission request to the foreign controller.

11. The method of claim 1, wherein the foreign method calling of the foreign node is further invoked in response to translated data structure data, the translated data structure data comprising one or more of sensor data and state information from one or more foreign devices in one or more foreign nodes.

12. The method of claim 1, wherein the foreign controller is one of an industrial automation controller, a building automation controller, and domain specific supervisor, and the permission grant is generated based on a state of a domain specific application associated with the foreign controller.

13. The method of claim 1, wherein the power management function modifies a foreign device power level to a modified power level if a modified power level satisfies a power level policy.

14. The method of claim 13, wherein the power level policy is satisfied if an occupancy is less than an occupancy threshold.

15. The method of claim 13, wherein the modified power level comprises one or more of reduced lighting and reduced heating, ventilation, and air conditioning (HVAC) settings.

16. An apparatus comprising:
   a non-transitory memory, communicatively coupled to a processor, the non-transitory memory storing code that performs:
   generating a native node comprising a proxy data structure that is defined with a native protocol and that represents information of a proxy device in a native namespace, and a foreign node comprising a foreign data structure that is defined with a foreign protocol and that represents information of a foreign device in a foreign namespace, wherein the proxy device communicates in a Common Industrial Protocol (CIP) and the foreign device communicates in a non-CIP protocol;
   generating protocol reference data that identifies protocol specific relationships between the native node and the foreign node under an address space;
   linking the native node and the foreign node in the native namespace and the foreign namespace by a translation function that automatically converts information between the foreign data structure and the proxy data structure using protocol specific structure converting functions;
   mapping a native method calling of the native node to a foreign method calling of the foreign node using a protocol specific method mapping function, wherein the native node method calling is a power management function operating on an energy scheduler that schedules power, and invokes the foreign node method calling of the foreign node;
   receiving a power management command from a network stack of a communications stack comprising the network stack, a network driver, and the energy scheduler, wherein the power management command modifies a power level of the foreign device, the communication stack manages a translation function for the power management command, and the network stack receives the power management command for a power level state mapping model;
   selecting foreign operators that correspond to the power management command with the power level state mapping model;
   translating the power management command into the foreign method calling using a foreign protocol proxy;
   communicating the foreign calling method to the energy scheduler and through the network driver to the foreign device; and
   in response to receiving a grant permission at the power level state mapping model from a foreign controller that manages the foreign device, communicating the foreign method calling to the foreign device.

17. The apparatus of claim 16, wherein the proxy data structure comprises translation variables that correspond to variables of the foreign data structure of the foreign node and the translation variables are organized as OPC Unified Architecture (UA) Variable Nodes with domain specific structured data types.

18. A non-transitory computer-readable storage medium having instructions stored there on that, in response to execution, cause a system comprising a processor to perform operations comprising:
   generating a native node comprising a proxy data structure that is defined with a native protocol and that represents information of a proxy device in a native namespace, and a foreign node comprising a foreign data structure that is defined with a foreign protocol and that represents information of a foreign device in a foreign namespace, wherein the proxy device communicates in a Common Industrial Protocol (CIP) and the foreign device communicates in a non-CIP protocol;
   generating protocol reference data that identifies protocol specific relationships between the native node and the foreign node under an address space;

linking the native node and the foreign node in the native namespace and the foreign namespace by a translation function that automatically converts information between the foreign data structure and the proxy data structure using protocol specific structure converting functions;

mapping a native method calling of the native node to a foreign method calling of the foreign node using a protocol specific method mapping function, wherein the native node method calling is a power management function operating on an energy scheduler that schedules power, and invokes the foreign node method calling of the foreign node;

receiving a power management command from a network stack of a communications stack comprising the network stack, a network driver, and the energy scheduler, wherein the power management command modifies a power level of the foreign device, the communication stack manages a translation function for the power management command, and the network stack receives the power management command for a power level state mapping model;

selecting foreign operators that correspond to the power management command with the power level state mapping model;

translating the power management command into the foreign method calling using a foreign protocol proxy;

communicating the foreign calling method to the energy scheduler and through the network driver to the foreign device; and in response to receiving a grant permission at the power level state mapping model from a foreign controller that manages the foreign device, communicating the foreign method calling to the foreign device.

19. The non-transitory computer-readable storage medium of claim 18, wherein the proxy data structure comprises translation variables that correspond to variables of the foreign data structure of the foreign node and the translation variables are organized as OPC Unified Architecture (UA) Variable Nodes with domain specific structured data types.

* * * * *